United States Patent
Hamel et al.

(10) Patent No.: US 11,405,200 B1
(45) Date of Patent: Aug. 2, 2022

(54) MULTILEVEL SPLIT KEYS FOR WALLET RECOVERY

(71) Applicant: Workday, Inc., Pleasanton, CA (US)

(72) Inventors: Bjorn Hamel, Dublin, CA (US); Prakash Sundaresan, Redmond, WA (US)

(73) Assignee: Workday, Inc., Pleasanton, CA (US)

( * ) Notice: Subject to any disclaimer, the term of this patent is extended or adjusted under 35 U.S.C. 154(b) by 127 days.

(21) Appl. No.: 16/880,155

(22) Filed: May 21, 2020

(51) Int. Cl.
*H04L 9/08* (2006.01)
*H04L 9/30* (2006.01)

(52) U.S. Cl.
CPC ............ *H04L 9/0894* (2013.01); *H04L 9/085* (2013.01); *H04L 9/0822* (2013.01); *H04L 9/30* (2013.01)

(58) Field of Classification Search
CPC ......... H04L 9/08; H04L 9/085; H04L 9/0891; H04L 9/0894; H04L 9/0822; H04L 9/30; H04L 9/0861; H04L 63/10; H04L 63/101; H04L 63/105; H04L 63/12; G06F 21/62; G06F 21/602; G06F 21/604; G06F 21/60
See application file for complete search history.

(56) References Cited

U.S. PATENT DOCUMENTS

| | | | |
|---|---|---|---|
| 5,796,830 A | 8/1998 | Johnson | |
| 10,439,812 B2 | 10/2019 | Patin | |
| 10,516,527 B1 | 12/2019 | Machani | |
| 11,057,210 B1* | 7/2021 | Sierra | H04L 9/3073 |
| 2003/0081785 A1 | 5/2003 | Boneh | |
| 2010/0318782 A1 | 12/2010 | Auradkar | |
| 2014/0337221 A1 | 11/2014 | Hoyos | |
| 2015/0186634 A1 | 7/2015 | Crandell | |
| 2015/0242616 A1 | 8/2015 | Oprea | |
| 2015/0254463 A1 | 9/2015 | Ryhorchuk | |
| 2016/0112193 A1 | 4/2016 | Li | |
| 2017/0083718 A1* | 3/2017 | Peddada | G06F 21/6227 |
| 2018/0375653 A1 | 12/2018 | Setty et al. | |
| 2019/0230092 A1 | 7/2019 | Patel | |
| 2019/0245688 A1 | 8/2019 | Patin | |
| 2021/0234678 A1* | 7/2021 | Armleder | H04L 9/0877 |
| 2021/0375409 A1* | 12/2021 | Romantsov | G06F 21/602 |
| 2022/0078005 A1* | 3/2022 | Lanc | G06F 21/6245 |

FOREIGN PATENT DOCUMENTS

WO 2019191215 10/2019

* cited by examiner

*Primary Examiner* — Shaqueal D Wade-Wright
(74) *Attorney, Agent, or Firm* — Van Pelt, Yi & James LLP

(57) ABSTRACT

A system for key storage and recovery includes an interface and a processor. The interface is configured to receive an indication to create a set of recovery encryption key shares. The processor is configured to receive a selection of one or more trusted entities from one or more categories; create a set of recovery encryption key shares based at least in part on one or more recovery encryption keys; and for a trusted entity of the trusted entities: 1) determine a trusted entity public key associated with the trusted entity; encrypt a recovery encryption key share of the set of recovery encryption key shares with the trusted entity public key to generate a trusted entity encrypted recovery encryption key share; and provide the trusted entity encrypted recovery encryption key share to the trusted entity.

19 Claims, 17 Drawing Sheets

300

Set Up Account Recovery

Who can help you recover your key?

Friends and people you trust ☐

Your bank ☐

Your employer ☐

Next

Fig. 3

Add Friends And Institutions

Trusted Person — Email Address: [ ]

Trusted Person — Email Address: [ ]

Trusted Person — Email Address: [ ]

⊞ Add Another

Bank [ ]
Enter your bank name to see if they participate

Employer [ ]
Enter your employer name to see if they participate

[ Next ]

Fig. 4          400

MULTILEVEL SPLIT KEYS FOR WALLET RECOVERY

BACKGROUND OF THE INVENTION

A database system distributes cryptographic digital credentials to a user to allow the user to prove qualifications (e.g., a degree, employment experience, health insurance coverage, etc.). Credentials can be assigned to a user by a trusted third party client of the database system (e.g., a university, an employer, an insurer). Typically credentials are accessed using a user private key stored on a user device. In the event the user private key is lost (e.g., as a result of loss or damage to the user device) and a password-encrypted backup copy of the user private key is inaccessible (e.g., in the event the password is forgotten), there is no way to recover the user private key, creating a problem where the digital credentials are permanently inaccessible.

BRIEF DESCRIPTION OF THE DRAWINGS

Various embodiments of the invention are disclosed in the following detailed description and the accompanying drawings.

FIG. 3 is a diagram illustrating an embodiment of a set up account recovery user interface window.

FIG. 4 is a diagram illustrating an embodiment of an add friends and institutions user interface window.

DETAILED DESCRIPTION

Figure 1:
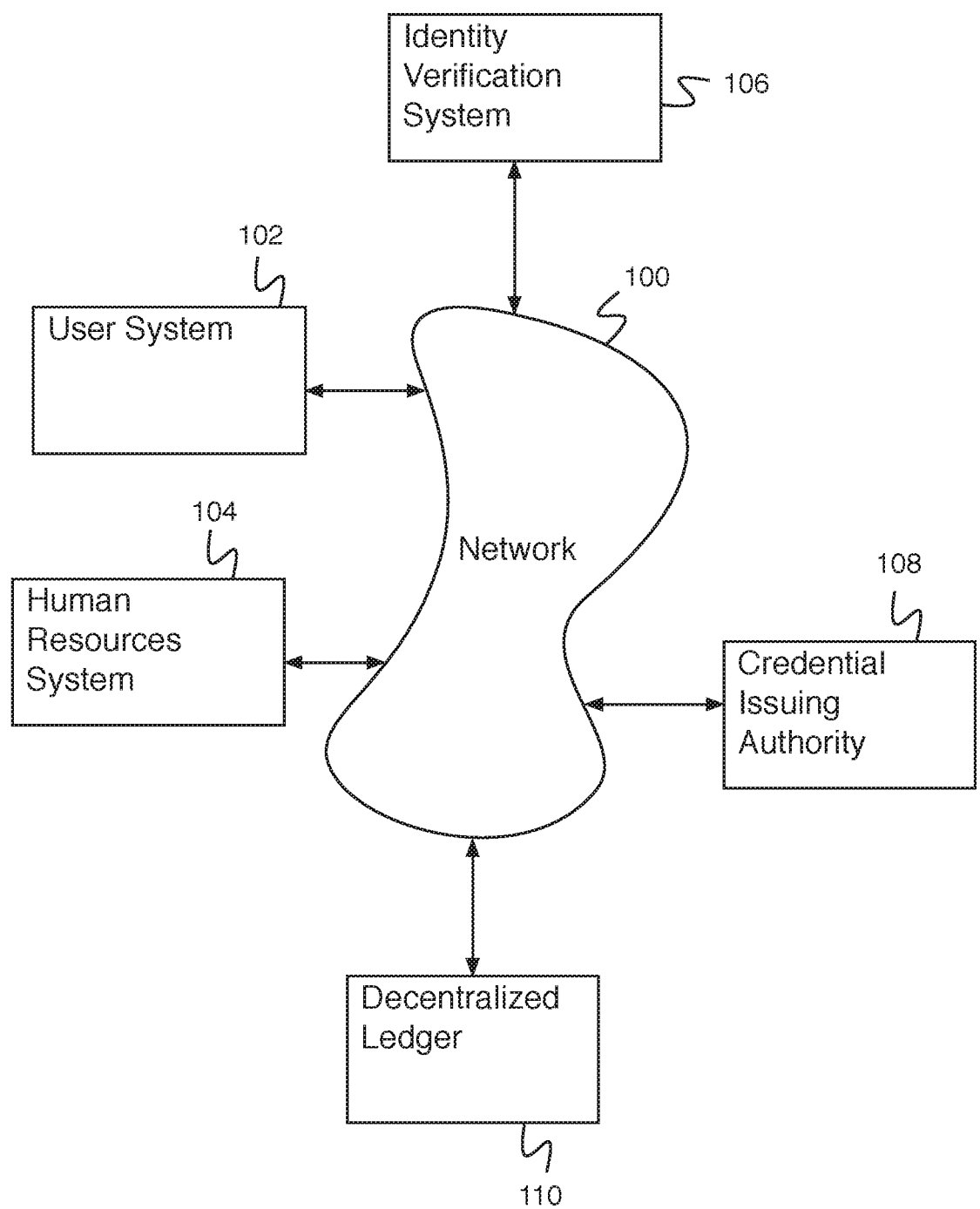
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for key storage comprises an interface configured to receive an indication to create a set of recovery encryption key shares, and a processor configured to receive a selection of one or more trusted entities from one or more categories, create a set of recovery encryption key shares based at least in part on one or more recovery encryption keys, and for a trusted entity of the trusted entities, determine a trusted entity public key associated with the trusted entity, encrypt a recovery encryption key share of the set of recovery encryption key shares with the trusted entity public key to generate a trusted entity encrypted recovery encryption key share, and provide the trusted entity encrypted recovery encryption key share to the trusted entity.

A system for key storage and recovery comprises a system for storing one or more recovery encryption keys (e.g., keys are multiple parts of a secret of Shamir's Secret Sharing Scheme). Upon receiving a request to create and store a user private key (e.g., upon initialization of the credential system), the system creates a user private key and one or more recovery encryption keys, and determines an encrypted private key by encrypting the user private key with the one or more recovery encryption keys. The one or more recovery encryption keys are divided into a plurality of shares, each share stored on a separate system. Each system storing a recovery encryption key share comprises a trusted system (e.g., system operated by an entity trusted by the user of the system for key storage and recovery). The trusted systems comprise user systems (e.g., user systems operated by people trusted by the user) and organization systems (e.g., systems operated by companies trusted by the user, e.g., an employer system, a bank system, a university system, a health insurance system, etc.). The user indicates a set of trusted systems for storing recovery key shares, and a minimum number of trusted systems required for recovering the recovery key. For example, the user could indicate 5 trusted friends to hold key shares, and indicate that any 3 of those shares are satisfactory to recover the recovery key; the user could indicate 4 trusted friends and 4 trusted companies to hold key shares, and indicate that key shares are required from 2 friends and 2 companies to recover the recovery key; the user could indicate 3 trusted friends and 3 trusted companies to hold key shares, and indicate that either all three key shares stored with friends or all three key shares stored with companies are required to recover the recovery key; etc. The user can also indicate any number of systems where the recovery key share stored by those systems are required for key recovery. In the case where key shares are required from both trusted user systems and trusted organization systems, two recovery keys are created and used to encrypt the private key in series; the first recovery key is divided into shares and provided to the user systems, the second recovery key is divided into shares and provided to the organization systems. In the case where key shares are required from either trusted user systems or trusted organization systems, two recovery keys are created and each used separately to encrypt the user private key, creating two encrypted private keys; the first recovery key is divided into shares and provided to the user systems, the second recovery key is divided into shares and provided to the organization systems. Prior to distributing a key share to a trusted system, the key share is encrypted with the public key for the trusted system, ensuring only the desired system is able to decrypt it and utilize it for key recovery.

In order to create a mechanism for authenticating access to the recovery encryption key shares stored by trusted companies, the user system creates an identifier document, signs the identifier document with a user private key, and provides the signed identifier document for storage to the credential issuing authority. The system then captures an image of a user identification (e.g., a driver's license image) as well as an image of the user (e.g., a "selfie") and provides the user identification image, the user image, and a public key associated with the identifier document to an identity validation service. An identity validation credential is received from the identity validation service, bound to the user identity. The identity validation credential is provided to the trusted organizations for use in validating the user identity when the recovery encryption key share is requested.

A system for key storage and recovery additionally comprises a system for recovering a recovery encryption key divided into two (or more) separate shares and stored on two (or more) separate systems (e.g., keys are multiple parts of a secret of Shamir's Secret Sharing Scheme). The system receives a request to recover a user private key, associated with an email address associated with the requesting user. The system provides the email address to the credential issuing authority and receives in return an identifier document and an associated identifier document public key. The request to the identity validation service made upon recovery encryption key storage is then performed. The system captures an image of a user identification and an image of the user, and provides the user identification image, the user image, and the identifier document public key to the identity validation service. An identity validation credential is received from the identity validation service. The user system then provides a request to each trusted system for a recovery encryption key share, each request associated with the identity validation credential received from the identity validation service. When the system successfully requests a recovery key share from the credential issuing authority, the credential issuing authority provides the requested key share and additionally provides an encrypted key request token for requesting an encrypted user private key. Additionally a request is provided to each trusted user for a recovery encryption key share. The request is provided via email, SMS, an in-app message, etc. In some embodiments, the system registers that it is in a recovery mode in order to confirm to other systems that recovery key shares should be provided. The system tracks recovery key shares as they are received, and when enough recovery key shares have been received, the system reconstructs the one or more recovery encryption keys using the recovery key shares. The system requests the encrypted user private key from the credential issuing authority using the encrypted key request token, and decrypts the encrypted user private key using one of the recovery encryption keys. In order to store the user private key securely, the system finally encrypts the user private key with a local encryption key.

The system for key storage and recovery improves the computer system by providing a secure way of storing a user private key backup inaccessible to any user or system other than the creating user. The process of dividing the recovery key into a plurality of shares and storing each share on a separate trusted system ensures that no one system has access to the recovery key, and only a user able to pass the identity validation checks can gain access to the recovery key. Accessing the key even in the event a trusted system is compromised will be very challenging, as key shares are required from many systems. The encrypted backup copy of the user private key can therefore be stored safely, and in the event that the user device storing the user private key is lost, damaged, stolen, data corrupted, etc., the user private key can be recovered and items cryptographically associated with that private key need not be recreated.

FIG. 1 is a block diagram illustrating an embodiment of a network system. In some embodiments, the network system of FIG. 1 comprises a network system for a system for key storage and recovery. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, human resources system 104, identity verification system 106, credential issuing authority 108, and decentralized ledger 110 communicate via network 100.

User system 102 comprises a user system for use by a user. For example, user system 102 comprises a system for communication, data access, computation, etc. User system 102 comprises a credential wallet for proving credential information. For example, credential information comprises information describing a college degree, employment tenure, years lived at a residence, medical insurance, etc. The credential wallet stores and/or accesses credentials issued by credential issuing authority 108 for proving credential information. User system 102 comprises a system for key storage and recovery.

For example, user system 102 comprises a system for key storage, comprising an interface configured to receive an indication to create a set of recovery encryption key shares, and a processor configured to receive a selection of one or more trusted entities from one or more categories, create a set of recovery encryption key shares based at least in part on one or more recovery encryption keys, and for a trusted entity of the trusted entities, determine a trusted entity public key associated with the trusted entity, encrypt a recovery encryption key share of the set of recovery encryption key shares with the trusted entity public key to generate a trusted entity encrypted recovery encryption key share, and provide the trusted entity encrypted recovery encryption key share to the trusted entity.

Human resources system 104 comprises an employer human resources computing system associated with an employer of the user of user system 102. In some embodiments, human resources system 104 comprises a trusted organization for user system 102. Identity verification system 106 comprises an identity verification system for verifying a user identity (e.g., based on a user image and/or a user identification image) and associated the user identity with a user identity document. In some embodiments, identity verification system provides an identity validation service accessible by other system components. Credential issuing authority 108 comprises a system for issuing credentials. For example, credential issuing authority receives an indication from a database system (e.g., a university database system, an employer database system, a medical insurance database system) to provide a credential for a user, creates, and provides the credential. Credentials are stored locally on a user system (e.g., user system 102) or on credential issuing authority 108 and accessed using a user private key. Decentralized ledger 110 comprises a decentralized ledger for decentralized identity management, storing decentralized identifiers associated with entities.

Figure 2:
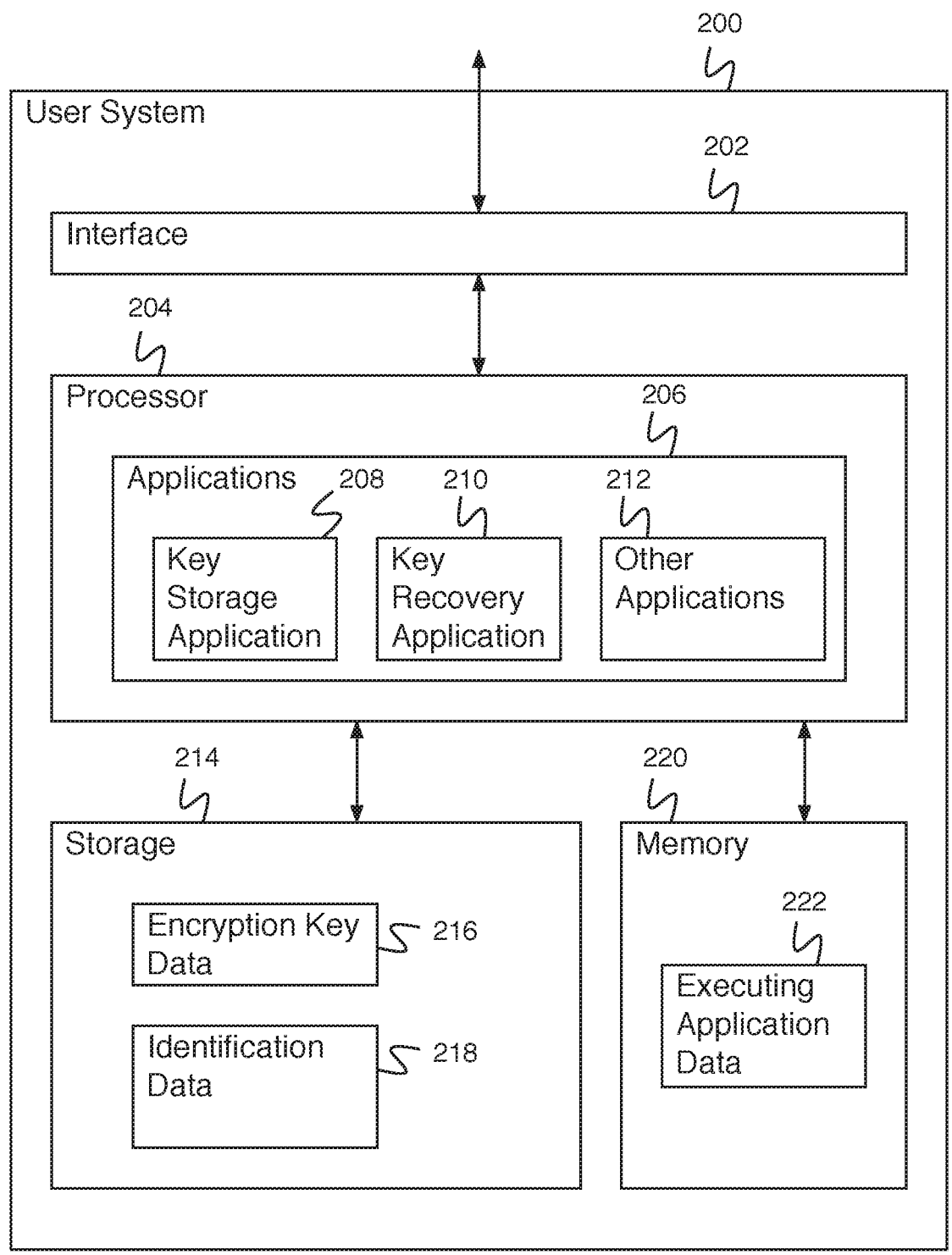
FIG. 2 is a block diagram illustrating an embodiment of a user system.

FIG. 2 is a block diagram illustrating an embodiment of a user system. In some embodiments, user system 200 comprises database system 108 of FIG. 1. In the example shown, database system 200 comprises interface 202. For example, interface 202 comprises an interface for receiving data, providing data, receiving a request for data, receiving a request to recover a user private key, receiving an indication to create a set of recovery encryption key shares, etc. Processor 204 comprises a processor for executing applications 206. Applications 206 comprises key storage application 208, key recovery application 210, and other applications 212. For example, key storage application 208 comprises an application configured to receive a selection of one or more trusted entities from one or more categories, create a set of recovery encryption key shares based at least in part on one or more recovery encryption keys, and for a trusted entity of the trusted entities, determine a trusted entity public key associated with the trusted entity, encrypt a recovery encryption key share of the set of recovery encryption key shares with the trusted entity public key to generate a trusted entity encrypted recovery encryption key share, and provide the trusted entity encrypted recovery encryption key share to the trusted entity. For example, key recovery application 210 comprises an application configured to provide a request for a recovery key share to each entity of a set of trusted entities, receive a set of recovery key shares from the set of trusted entities, and in the event that the set of recovery key shares comprises a required set of recovery key shares: combine the recovery key shares of the set of recover key shares to determine one or more recovered encryption keys, and decrypt an encrypted backup copy of the user private key using the one or more recovered encryption keys. Other applications 212 comprises any other appropriate applications (e.g., a communications application, a chat application, a web browser application, a document preparation application, a report preparation application, a user interface application, a data analysis application, etc.). Storage 214 comprises encryption key data 216 (e.g., a private encryption key, a public encryption key, a recovery encryption key, a local encryption key, an identifier document key, etc.) and identification data 218 (e.g., an identifier document, an identification image, a user image, etc.). Memory 220 comprises executing application data 224 comprising data associated with applications 206.

FIG. 3 is a diagram illustrating an embodiment of a set up account recovery user interface window. In some embodiments, user interface window 300 comprises a user interface window provided by user system 200 of FIG. 2. In the example shown, user interface window 300 comprises a window for a user indication of one or more categories of trusted entities for distribution for recovery key shares. In the example shown, the user is given the option of selecting one or more of "Friends and people you trust," "Your bank," and "Your employer." In various embodiments, other potential categories include "Your university," "Your hospital," "Your rental manager," etc. The user indicates desired categories of the set of categories using check boxes, and indicates to the "Next" button that the selection is complete.

FIG. 4 is a diagram illustrating an embodiment of an add friends and institutions user interface window. In some embodiments, user interface window 400 comprises a user interface window provided by user system 200 of FIG. 2. In the example shown, user interface window 400 comprises a window for a user indication of trusted friends and institutions. User interface window 400 comprises a set of text entry user interface boxes for entering a set of email addresses associated with trusted people, as well as "Add another" user interface element for creating additional text entry user interface boxes for entering additional email addresses of trusted people. User interface window 400 additionally comprises a text entry box for entering a bank name for indicating a user bank as a trusted organization and a text entry box for entering an employer name for indicating a user employer as a trusted organization. For example, the text entry box for entering a bank name and the text entry box for entering an employer name comprise text entry boxes including a feedback element for displaying whether the entered bank name or employer name comprises the name of a participating bank or employer. The user indicates the desired trusted entities, and indicates to the "Next" button that the selection is complete.

Figure 5:
FIG. 5 is a diagram illustrating an embodiment of a complete setup user interface window.

FIG. 5 is a diagram illustrating an embodiment of a complete setup user interface window. In some embodiments, user interface window 500 comprises a user interface window provided by user system 200 of FIG. 2. In the example shown, user interface window 500 comprises a window for a user indication of one or more threshold numbers of entities for key recovery. User interface window 500 comprises a number entry box for entering a number of friends providing key shares required for account recovery and a number entry box for entering a number of organizations providing key shares required for account recovery. User interface 500 additionally comprises a menu for providing an "AND/OR" indication comprising an indication of whether key shares are required from friends AND organizations; or whether key shares are required from friends OR organizations. User interface 500 additionally comprises a "must include" selector for selecting a friend or an organization whose key share is required for key recovery, as well as an add another user interface element for creating additional "must include" selectors for selecting additional friends or organizations whose key share is required for key recovery. The user makes a desired set of indications, and indicates to the "Next" button that the use of the interface is complete.

Figure 6:
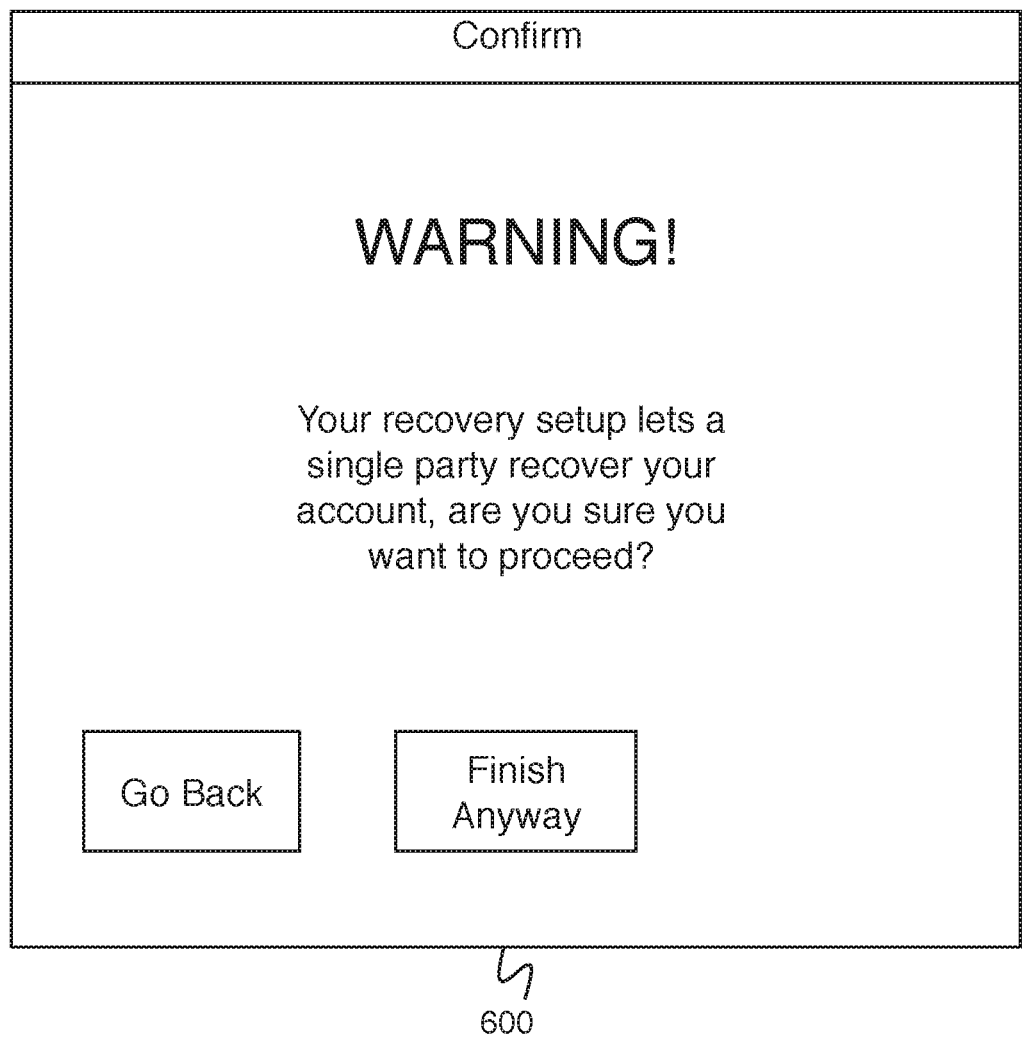
FIG. 6 is a diagram illustrating an embodiment of a confirm user interface window.

FIG. 6 is a diagram illustrating an embodiment of a confirm user interface window. In some embodiments, user interface window 600 comprises a user interface window provided by user system 200 of FIG. 2. In the example shown, user interface window 600 comprises a window for warning a user that the recovery setup lets a single party recover the account. The system is designed to require a set of parties all to participate in account recovery, however it is possible for the user to indicate to only require a single party. In the event the system determines that only a single party to recover the account, user interface window 600 is provided to the user. User interface window 600 comprises a "Finish Anyway" button for receiving a user indication to complete account recovery setup even though a single party can recover the account, and a "Go Back" button for receiving a user indication to return to a complete setup user interface window to change one or more setup indications.

Figure 7:
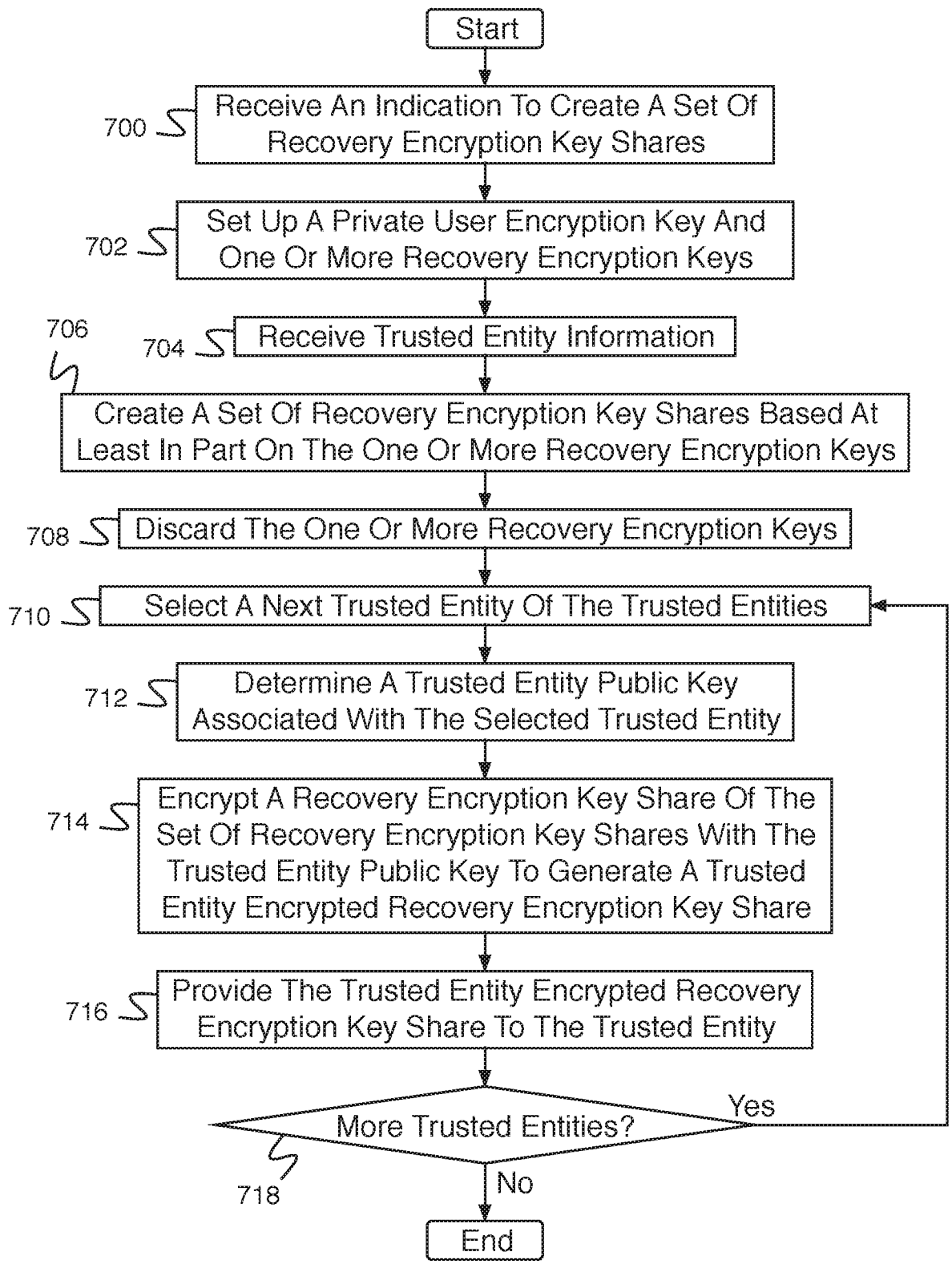
FIG. 7 is a flow diagram illustrating an embodiment of a process for key storage.

FIG. 7 is a flow diagram illustrating an embodiment of a process for key storage. In some embodiments, the process of FIG. 7 is executed by user system 102 of FIG. 1. In the example shown, in 700, an indication to create a set of recovery encryption key shares is received. In 702, a private user encryption key and one or more recovery encryption keys are set up. In 704, trusted entity information is received. In 706, a set of recovery encryption key shares is created based at least in part on the one or more recovery encryption keys. In 708, the one or more recovery encryption keys are discarded. For example, the one or more recovery encryption keys are used to generate the set of recovery encryption key share, and once the set of recovery encryption key shares is generated, the one or more recovery encryption keys are destroyed so that they are not a security risk for perhaps generating the set of recovery encryption key shares by a bad actor finding a stored copy of the set of recovery encryption key shares and using them to generate the encryption key shares. In 710, a next trusted entity of the trusted entities is selected. In some embodiments, the next trusted entity comprises the first trusted entity of the trusted entities. In 712, a trusted entity public key associated with the selected trusted entity is determined. For example, the trusted entity public key is looked up in a credential platform (e.g., as stored using a digital identity document in a ledger (e.g., a public ledger, a blockchain ledger, etc.)). In 714, a recovery encryption key share of the set of recovery encryption key shares is encrypted with the trusted entity public key to generate a trusted entity encrypted recovery encryption key share. In 716, the trusted entity encrypted recovery encryption key share is provided to the trusted entity. In 718, it is determined whether there are more trusted entities. In the event it is determined that there are more trusted entities, control passes to 710. In the event it is determined that there are not more trusted entities, the process ends.

Figure 8:
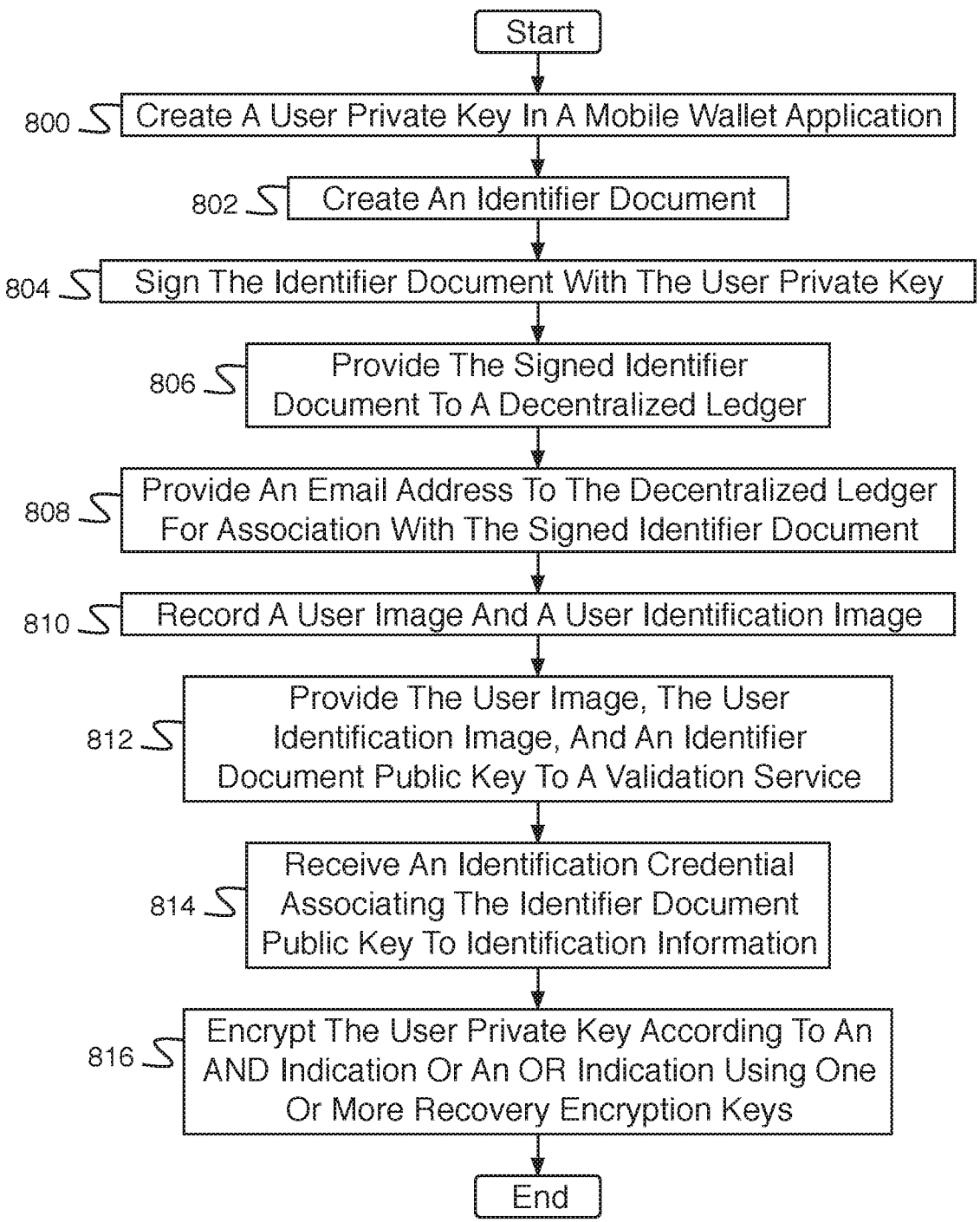
FIG. 8 is a flow diagram illustrating an embodiment of a process for setting up a private encryption key and one or more recovery encryption keys.

FIG. 8 is a flow diagram illustrating an embodiment of a process for setting up a private encryption key and one or more recovery encryption keys. In some embodiments, the process of FIG. 8 implements 702 of FIG. 7. In the example shown, in 800, a user private key in a mobile wallet application is created. In 802, an identifier document is created. In 804, the identifier document is signed with the user private key. In 806, the signed identifier document is provided to a decentralized ledger. In 808, an email address is provided to the decentralized ledger for associated with the signed identifier document. In 810, a user image (e.g., a "selfie") and a user identification image (e.g., a driver's license image, a passport image, etc.) are recorded. In 812, the user image, the user identification image, and an identifier document public key are provided to a validation service. For example, the user identification image, the user image, and an identifier document public key are provided to a validation service as executed on an identity verification system (e.g., identity verification system 106 of FIG. 1). In 814, an identification credential associating the identifier document public key to identification information is received. In 816, the user private key is encrypted according to an AND indication or an OR indication using one or more recovery encryption keys.

Figure 9:
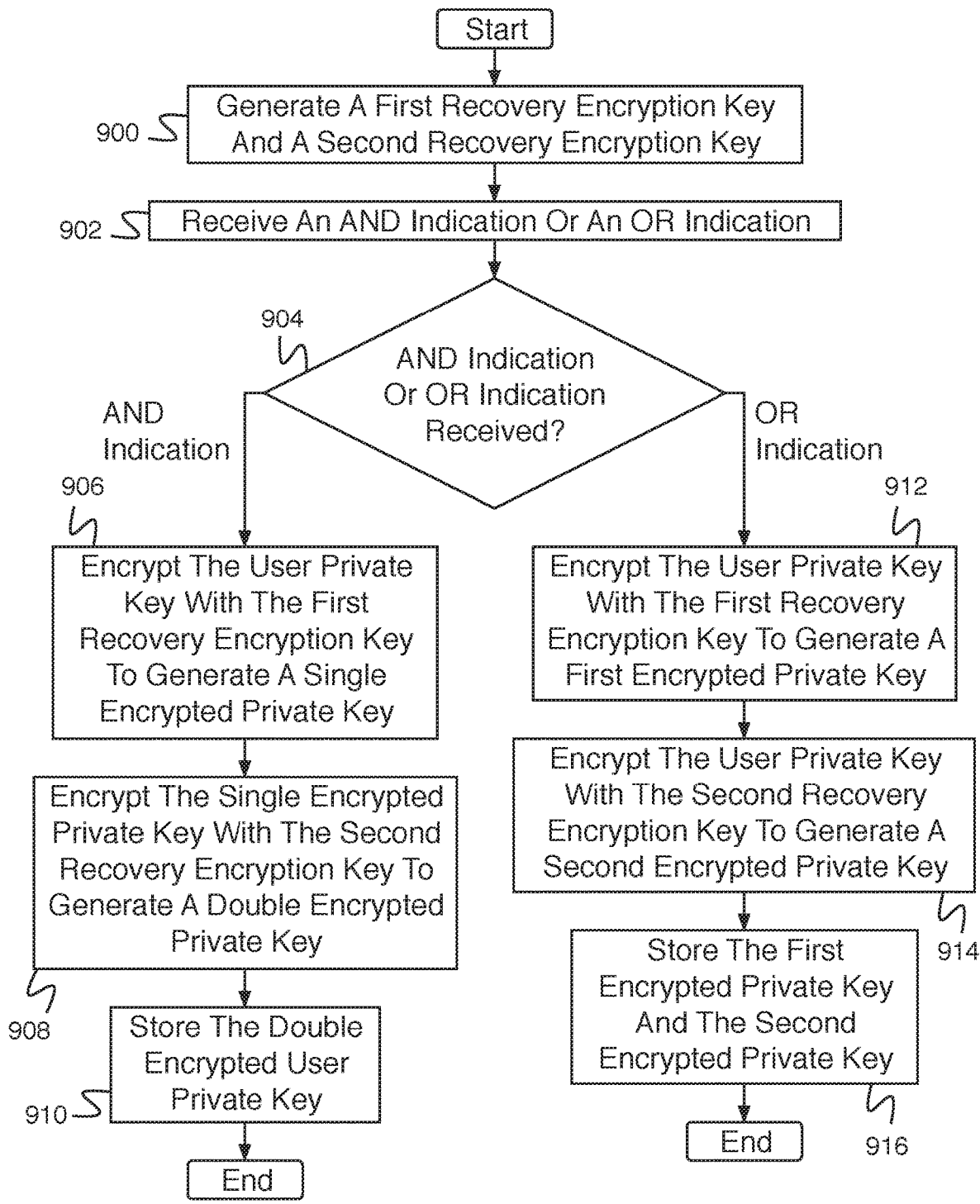
FIG. 9 is a flow diagram illustrating an embodiment of a process for encrypting a user private key according to an AND indication or an OR indication using one or more recovery encryption keys.

FIG. 9 is a flow diagram illustrating an embodiment of a process for encrypting a user private key according to an AND indication or an OR indication using one or more recovery encryption keys. In some embodiments, the process of FIG. 9 implements 816 of FIG. 8. In the example shown, in 900, a first recovery encryption key and a second recovery encryption key are generated. In 902, an AND indication or an OR indication is received. In 904, it is determined whether an AND indication or an OR indication was received. In the event it is determined that an AND indication was received, control passes to 906. In 906, the user private key is encrypted with the first recovery encryption key to generate a single encrypted private key. In 908, the single encrypted private key is encrypted with the second recovery encryption key to generate a double encrypted private key. For example, both a person recovery encryption key and an organization recovery encryption key are required to recover the user private key. In 910, the double encrypted user private key is stored, and the process ends. In the event it is determined in 904 that an OR indication is received, control passes to 912. In 912, the user private key is encrypted with the first recovery encryption key to generate a first encrypted private key. In 914, the user private key is encrypted with the second recovery encryption key to generate a second encrypted private key. For example, either a person recovery encryption key or an organization recovery encryption key are required to recover the user private key. In 916, the first encrypted private key and the second encrypted private key are stored.

In some embodiments, a required group of trusted entities comprising entities indicated as required for key recovery is created. A third recovery encryption key is created and divided into a set of shares, wherein each share is distributed to a trusted entity of the required group of trusted entities. The third recovery encryption key is divided into shares such that all shares are required for recovery of the third recovery encryption key. In the event an AND indication was received, the double encrypted private key is encrypted using the third recovery encryption key to create a triple encrypted private key. In the event an OR indication was received, the first encrypted private key and the second encrypted private key are encrypted with the third recovery encryption key to create a first double encrypted private key and a second double encrypted private key.

Figure 10:
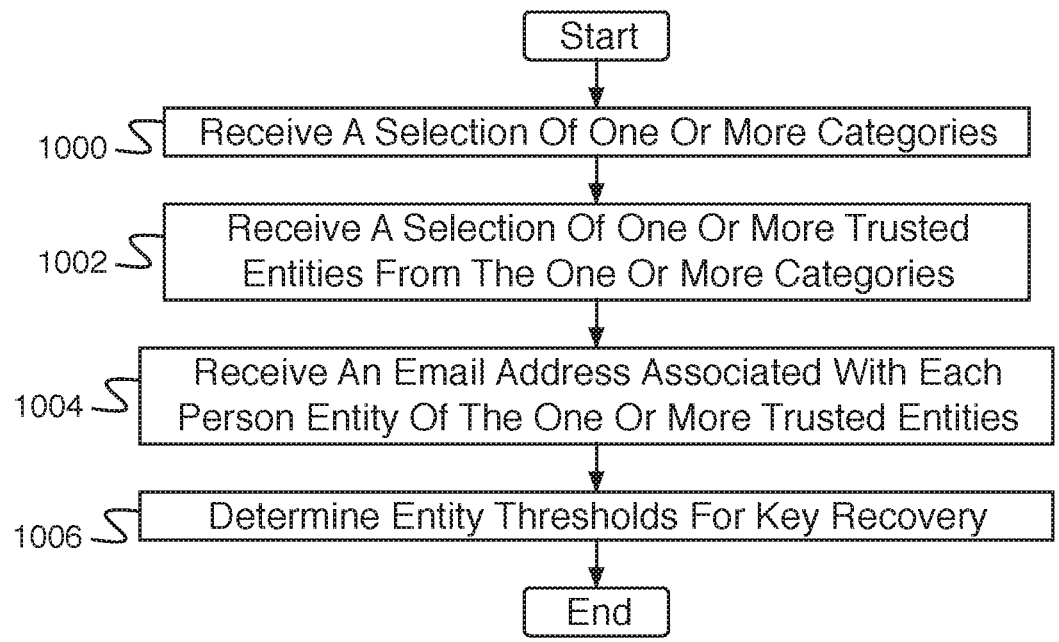
FIG. 10 is a flow diagram illustrating an embodiment of a process for receiving trusted entity information.

FIG. 10 is a flow diagram illustrating an embodiment of a process for receiving trusted entity information. In some embodiments, the process of FIG. 10 implements 704 of FIG. 7. In the example shown, in 1000, a selection of one or more categories is received. For example, a selection of one or more categories is received via the user interface of FIG. 3. In 1002, a selection of one or more trusted entities from the one or more categories is received. In 1004, an email address associated with each person entity of the one or more trusted entities is received. For example, a selection of one or more trusted entities from the one or more categories and an email address associated with each person entity of the one or more trusted entities is received via the user interface of FIG. 4. In 1006, entity thresholds for key recovery are determined. For example, entity thresholds for key recovery are determined based at least in part on a selection of one or more threshold numbers of trusted entities made via the user interface of FIG. 5.

Figure 11:
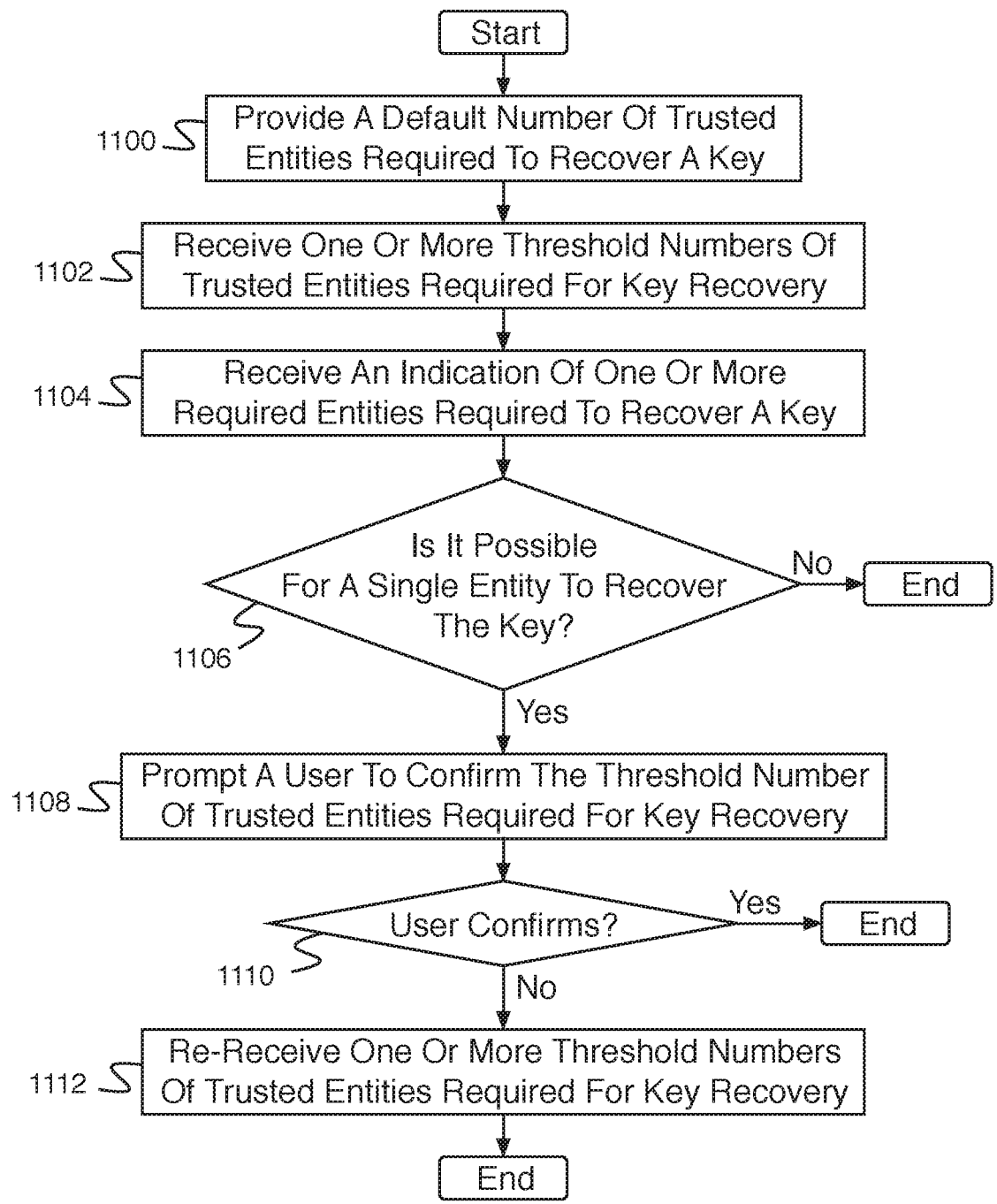
FIG. 11 is a flow diagram illustrating an embodiment of a process for determining entity thresholds for key recovery.

FIG. 11 is a flow diagram illustrating an embodiment of a process for determining entity thresholds for key recovery. In some embodiments, the process of FIG. 11 implements 1006 of FIG. 10. In the example shown, in 1100, a default number of trusted entities required to recover a key is provided. For example, the default threshold number of trusted entities comprises one fewer than the total number of person entities and one fewer than the total number of organization entities. In 1102, one or more threshold numbers of trusted entities required for key recovery is received. In 1104, an indication of one or more required entities required to recover a key is received. For example, a selection of one or more required entities required to recover a key is received via the user interface of FIG. 5. In 1106, it is determined whether it is possible for a single entity to recover the key. For example, the system determines if there is one or more entities that are used for key recovery. In some embodiments, the risk associated with the system is confirmed, and an option to go back and pick a higher threshold number of entities required for recovery and, in some cases, prompted for. In the event it is determined that it is not possible for a single entity to recover the key, the process ends. In the event it is determined that it is possible for a single entity to recover the key, control passes to 1108. In 1108, a user is prompted to confirm the threshold number of trusted entities required for key recovery. For example, a user is prompted to confirm the threshold number of trusted entities required for key recovery using the user interface of FIG. 6. In 1110, it is determined wither the user confirms the threshold number of trusted entities required for key recovery. In the event it is determined that the user confirms the threshold number of trusted entities required for key recovery, the process ends. In the event that the user does not confirm the threshold number of trusted entities required for key recovery, control passes to 1112. In 1112, the one or more threshold numbers of trusted entities required for key recovery are re-received.

Figure 12:
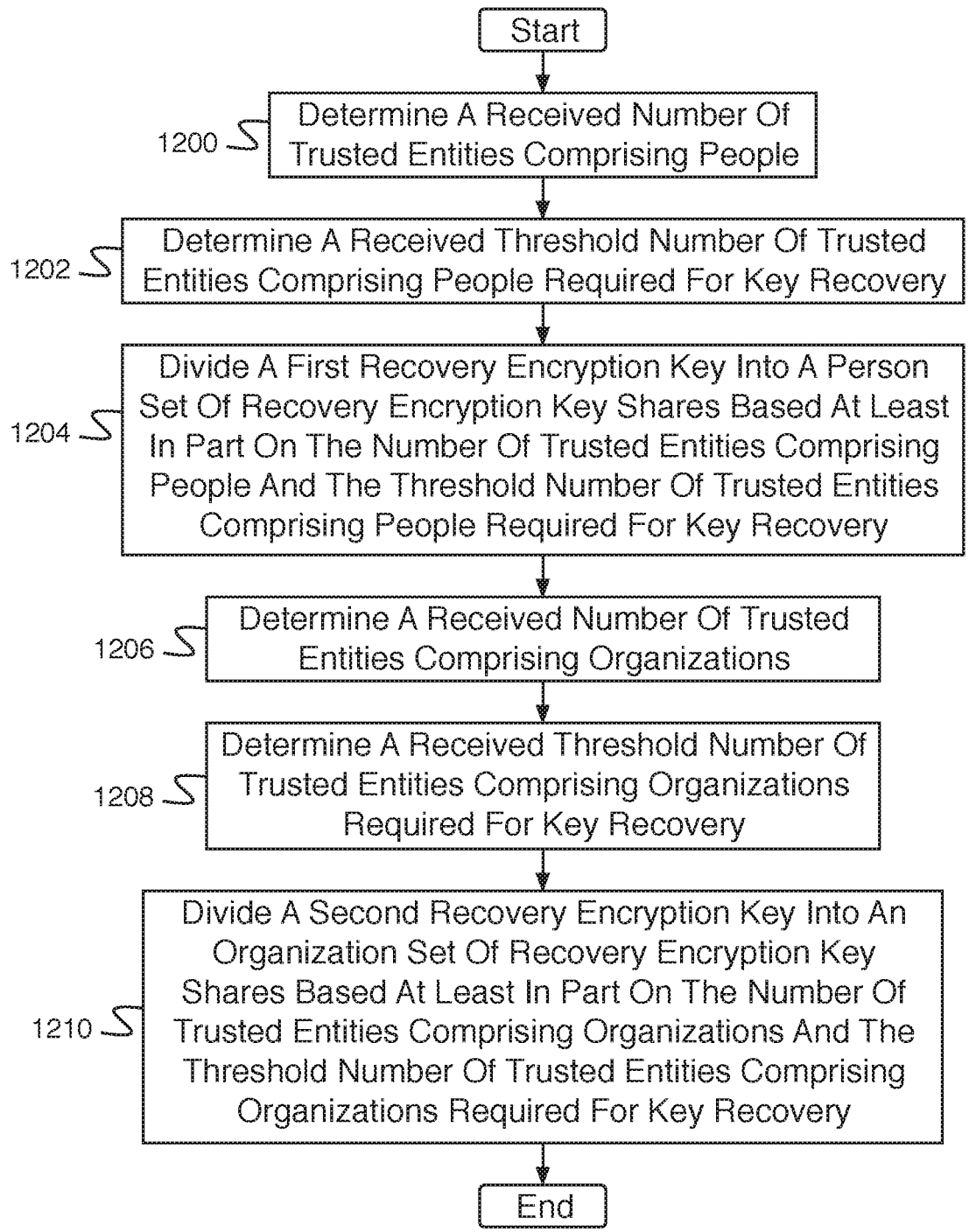
FIG. 12 is a flow diagram illustrating an embodiment of a process for creating a set of recovery encryption key shares based at least in part on one or more recovery encryption keys.

FIG. 12 is a flow diagram illustrating an embodiment of a process for creating a set of recovery encryption key shares based at least in part on one or more recovery encryption keys. In some embodiments, the process of FIG. 12 implements 706 of FIG. 7. In the example shown, in 1200, a received number of trusted entities comprising people is determined. In 1202, a received threshold number of trusted entities comprising people required for key recovery is determined. In 1204, a first recovery encryption key is divided into a person set of recovery encryption key shares based at least in part on the number of trusted entities comprising people and the threshold number of trusted entities comprising people required for key recovery. For example, the first recovery encryption key is divided into a set of recovery encryption key shares using Shamir's Secret Sharing Algorithm. For example, the person set of recovery encryption key shares can be combined to create a person recovery encryption key. In 1206, a received number of trusted entities comprising organizations is determined. In 1208, a received threshold number of trusted entities comprising organizations required for key recovery is determined. In 1210, a second recovery encryption key is divided into an organization set of recovery encryption key shares based at least in part on the number of trusted entities comprising organizations and the threshold number of trusted entities comprising organizations required for key recovery. For example, the second recovery encryption key is divided into a set of recovery encryption key shares using Shamir's Secret Sharing Algorithm. For example, the organization set of recovery encryption key shares can be combined to create an organization recovery encryption key.

Figure 13:
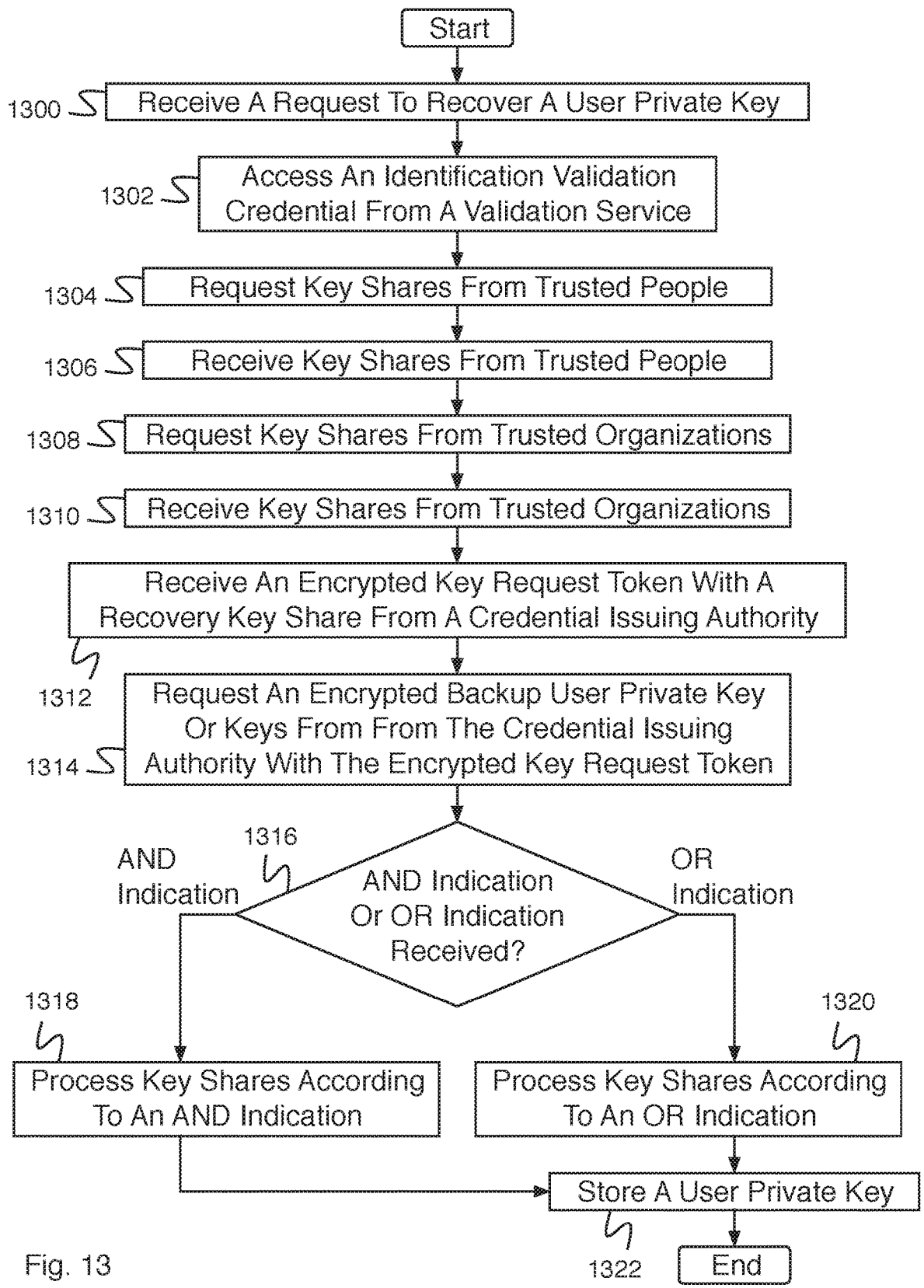
FIG. 13 is a flow diagram illustrating an embodiment of a process for recovering a key.

FIG. 13 is a flow diagram illustrating an embodiment of a process for recovering a key. In some embodiments, the process of FIG. 13 is executed by user system 102 of FIG. 1. In the example shown, in 1300, a request to recover a user private key is received. In 1302, an identification validation credential is accessed from a validation service. In 1304, key shares are requested from trusted people. In 1306, key shares are received from trusted people. In 1308, key shares are requested from trusted organizations. In 1310, key shares are received from trusted organizations. In 1312, an encrypted key request token is received with a recovery key share from a credential issuing authority. In 1314, an encrypted backup user private key or keys is requested from the credential issuing authority with the encrypted key request token. In 1316, it is determined whether an AND indication or an OR indication was received. In the event it is determined that an AND indication was received, control passes to 1318. In 1318, key shares are processed according to an AND indication. Control then passes to 1322. In the event it is determined in 1316 that an OR indication was received, control passes to 1320. In 1320, key shares are processed according to an OR indication. In 1322, a user private key is stored.

Figure 14:
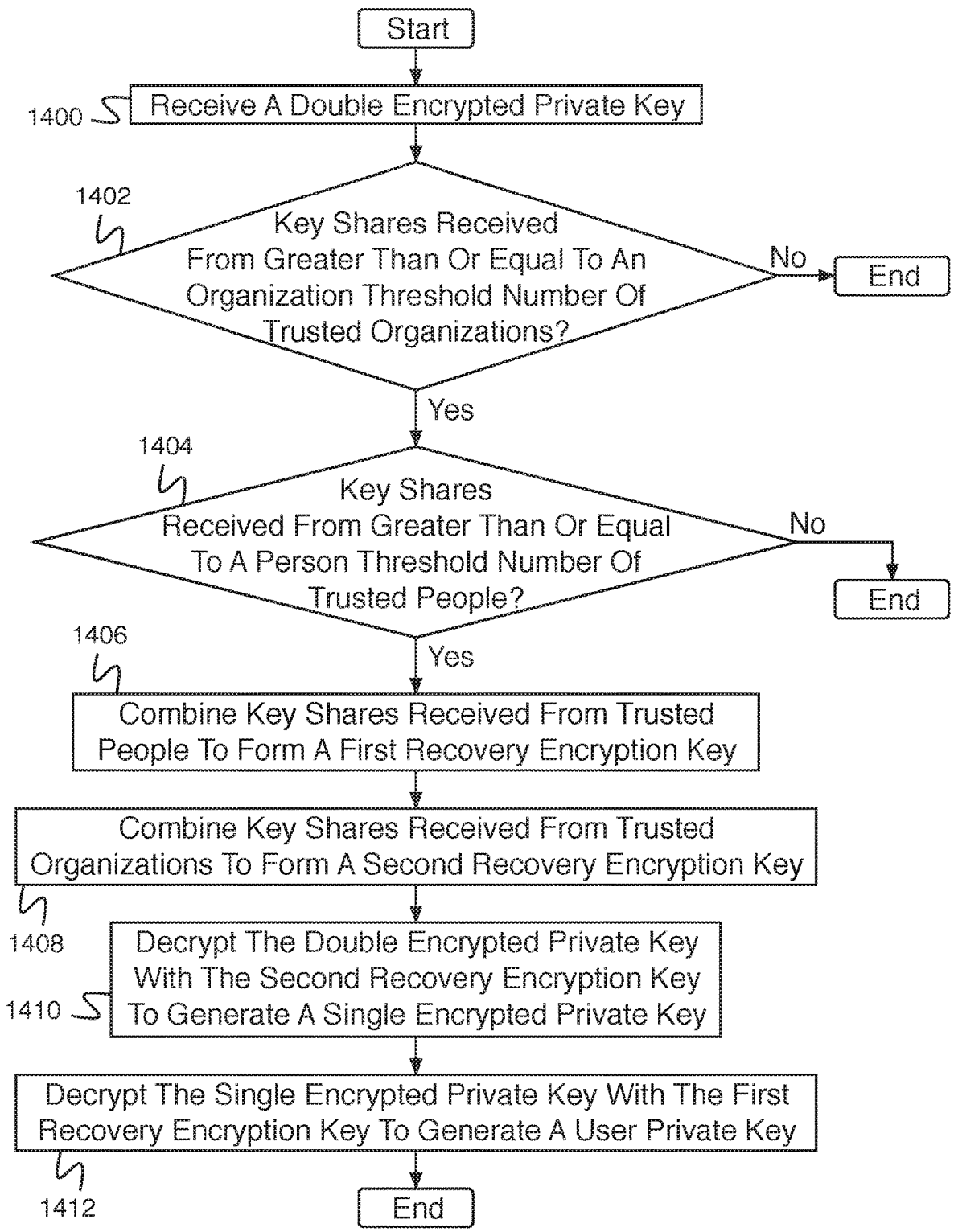
FIG. 14 is a flow diagram illustrating an embodiment of a process for processing key shares according to an AND indication.

FIG. 14 is a flow diagram illustrating an embodiment of a process for processing key shares according to an AND indication. In some embodiments, the process of FIG. 14 implements 1318 of FIG. 13. In the example shown, in 1400, a double encrypted private key is received. In 1402, it is determined whether key shares have been received from greater than an organization threshold number of trusted organizations. In the event it is determined that key shares were not received from greater than an organization threshold number of trusted organizations, the process ends. In the event it is determined that key shares were received from greater than or equal to an organization threshold number of trusted organizations, control passes to 1404. In 1404, it is determined whether key shares have been received from greater than a person threshold number of trusted people. In the event it is determined that key shares were not received from greater than a person threshold number of trusted people, the process ends. In the event it is determined that key shares were received from greater than a person threshold number of trusted people, control passes to 1406. In 1406, key shares received form trusted people are combined to form a first recovery encryption key. In 1408, key shares received from trusted organizations are combined to form a second recovery encryption key. In 1410, the double encrypted private key is decrypted with the second recovery encryption key to generate a single encrypted private key. In 1412, the single encrypted private key is decrypted with the first recovery encryption key to generate a user private key.

In some embodiments, a triple encrypted private key is received in 1400, wherein the triple encrypted private key is encrypted with a third recovery encryption key associated with a group of entities required for key recovery. In the event it is determined that key shares associated with the third recovery encryption key are received from all entities required for key recovery, the key shares are combined to determine the third recovery encryption key and the third recovery encryption key is used to decrypt the triple encrypted private key to determine the double encrypted private key.

Figure 15:
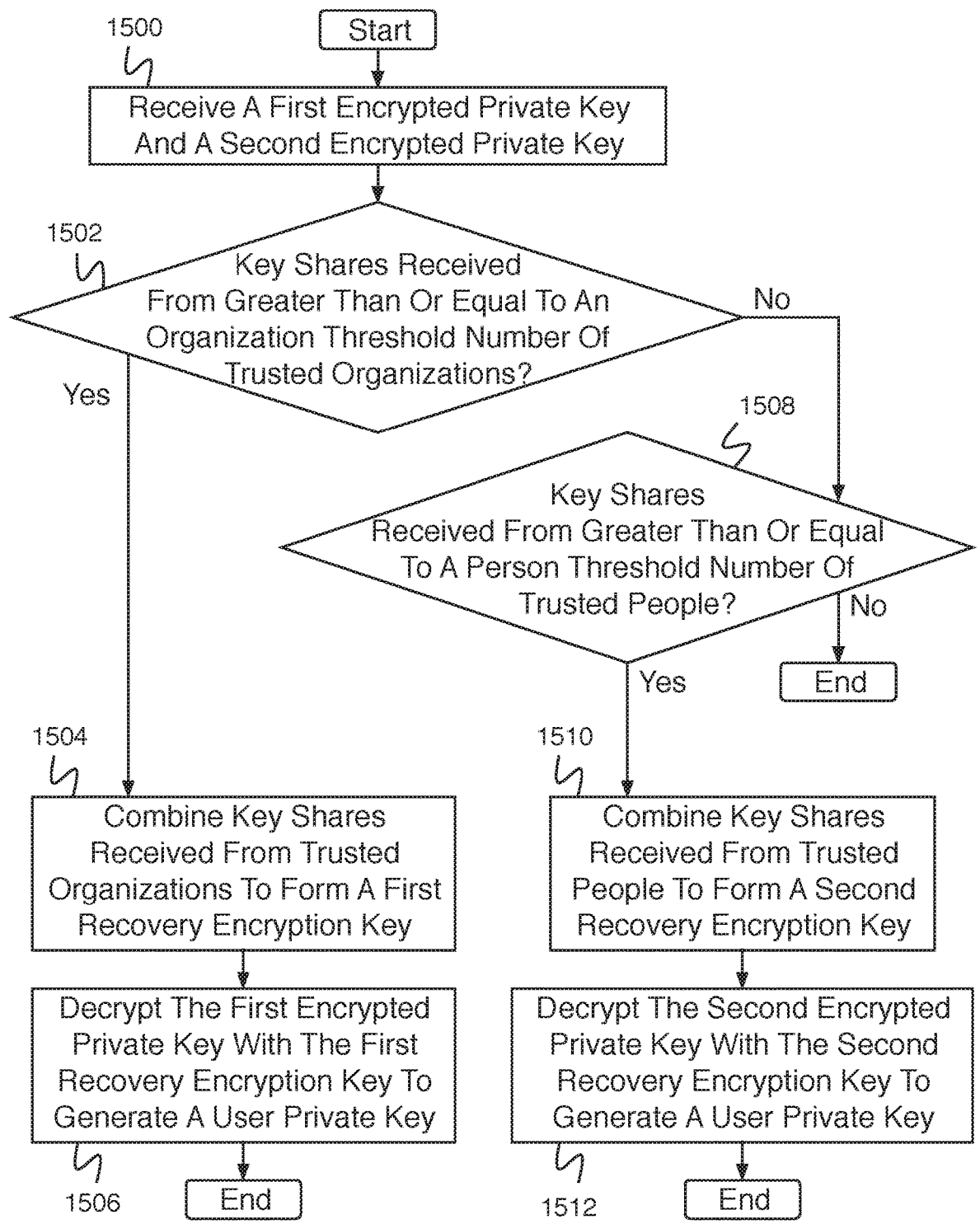
FIG. 15 is a flow diagram illustrating an embodiment of a process for processing shares according to an OR indication.

FIG. 15 is a flow diagram illustrating an embodiment of a process for processing shares according to an OR indication. In some embodiments, the process of FIG. 15 implements 1320 of FIG. 13. In the example shown, in 1500, a first encrypted private key and a second encrypted private key are received. In 1502, it is determined whether key shares are received from greater than or equal to an organization threshold number of trusted organizations. In the event it is determined that key shares have been received from greater than or equal to an organization threshold number of trusted organizations, control passes to 1504. In 1504, the key shares received from trusted organizations are combined to form a first recovery encryption key. In 1506, the first encrypted private key is decrypted with the first recovery encryption key to generate a user private key, and the process ends. In the event it is determined in 1502 that key shares have not been received from greater than an organization threshold number of trusted organizations, control passes to 1508. In 1508, it is determined whether key shares have been received from greater than or equal to a person threshold number of trusted people. In the event it is determined that key shares have not been received from greater than or equal to a person threshold number of trusted people, the process ends. In the event it is determined that key shares have been received from greater than or equal to a person threshold number of trusted people, control passes to 1510. In 1510, key shares received from trusted people are received from form a second recovery encryption key. In 1512, the second encrypted private key is decrypted with the second recovery encryption key to generate a user private key.

In some embodiments, a first double encrypted private key and a second double encrypted private key are received in 1500, wherein the first double encrypted private key and the second double encrypted private key are encrypted with a third recovery encryption key associated with a group of entities required for key recovery. In the event it is determined that key shares associated with the third recovery encryption key are received from all entities required for key recovery, the key shares are combined to determine the third recovery encryption key and the third recovery encryption key is used to decrypt the first double encrypted private key and the second double encrypted private key to determine the first encrypted private key and the second encrypted private key.

Figure 16:
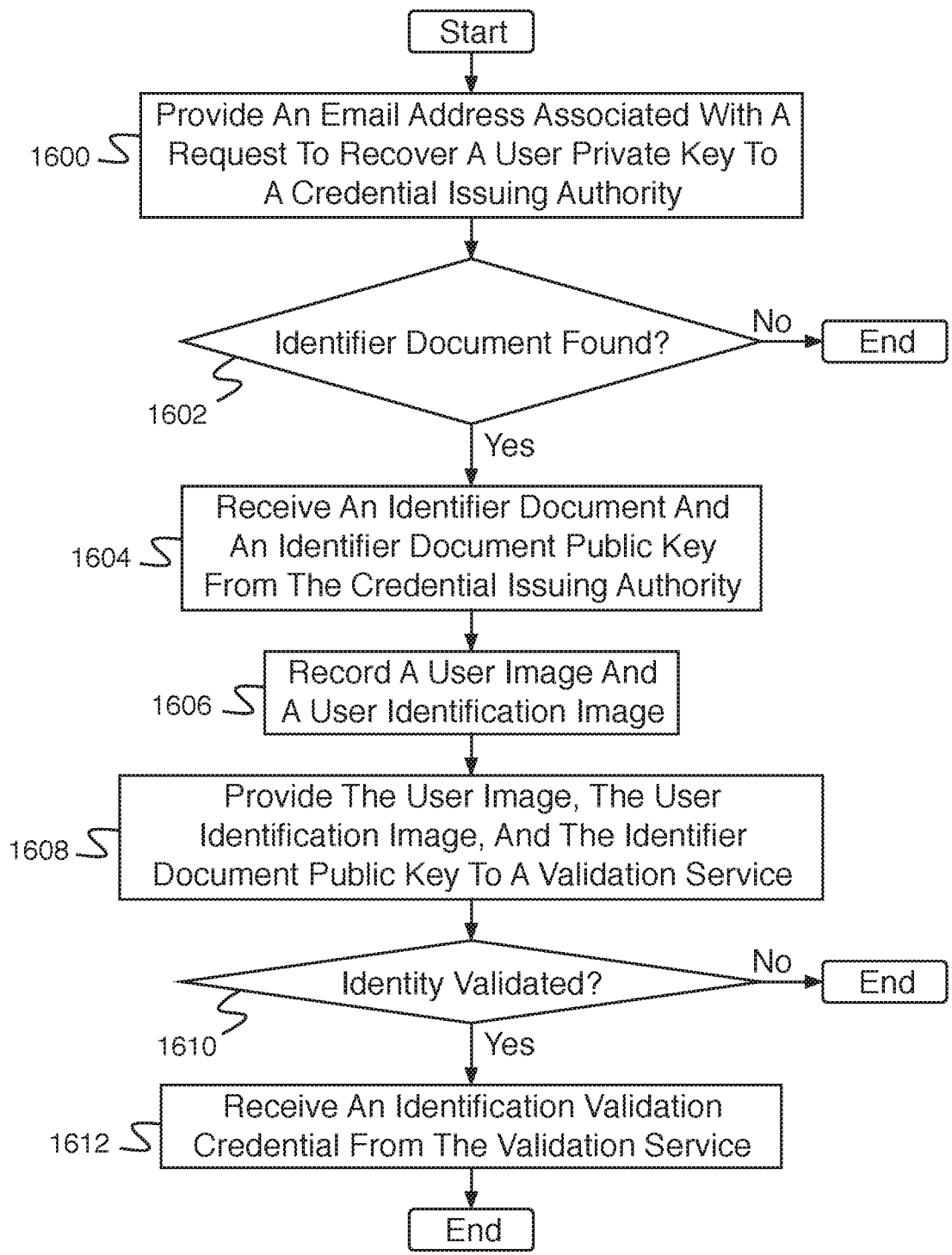
FIG. 16 is a flow diagram illustrating an embodiment of a process for accessing an identification validation credential from a validation service.

FIG. 16 is a flow diagram illustrating an embodiment of a process for accessing an identification validation credential from a validation service. In some embodiments, the process of FIG. 4 implements 1302 of FIG. 13. In the example shown, in 1600, an email address associated with a request to recover a user private key is provided to a credential issuing authority. In 1602, it is determined whether an identifier document is found. For example, it is determined whether the credential issuing authority has found an identifier document associated with the email address in a decentralized ledger. In the event it is determined that an identifier document is not found, the process ends. In the event it is determined that an identifier document is found, control passes to 1604. In 1604, an identifier document and an identifier document public key are received from the credential issuing authority. In 1606, a user image and a user identification image are recorded (e.g., with a user system camera). In 1608, the user image, the user identification image, and the identifier document public key are provided to a validation service. In 1610, it is determined whether the user identity is validated (e.g., whether the validation service is able to associate the user image, the user identification image, and the identifier document public key with a valid user). In the event it is determined that the identity is not validated, the process ends. In the event it is determined that the identity is validated, control passes to 1612. In 1612, an identification validation credential is received from the validation service.

Figure 17:
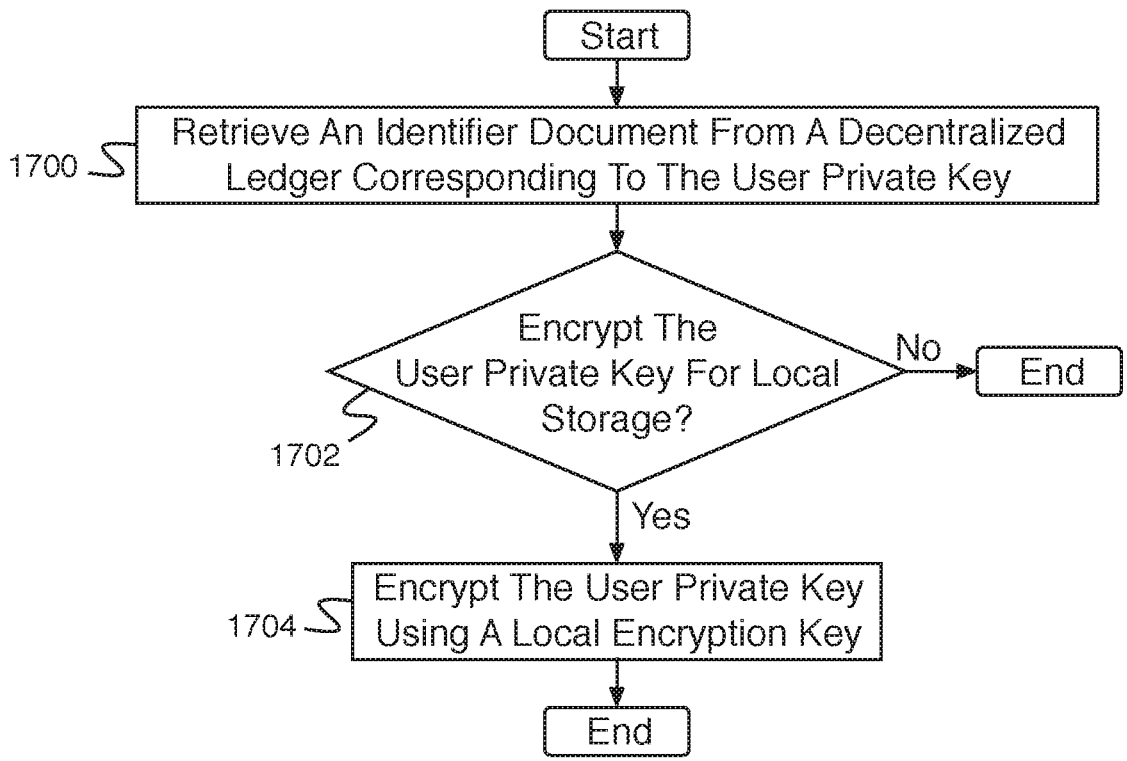
FIG. 17 is a flow diagram illustrating an embodiment of a process for storing a user private key.

FIG. 17 is a flow diagram illustrating an embodiment of a process for storing a user private key. In some embodiments, the process of FIG. 17 implements 1322 of FIG. 13. In the example shown, in 1700, an identifier document is retrieved from a decentralized ledger corresponding to the user private key. In 1702 it is determined whether to encrypt the user private key for local storage. In the event it is determined not to encrypt the user private key for local storage, the process ends. In the event it is determined to encrypt the user private key for local storage, control passes to 1704. In 1704, the user private key is encrypted using a local encryption key.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for key storage and recovery, comprising:
an interface configured to receive an indication to create a set of recovery encryption key shares; and
a processor configured to:
receive a selection of a set of trusted entities from one or more categories;
create a set of recovery encryption key shares based at least in part on one or more recovery encryption keys; and
for a trusted entity of the set of trusted entities:
determine a trusted entity public key associated with the trusted entity;
encrypt a recovery encryption key share of the set of recovery encryption key shares with the trusted entity public key to generate a trusted entity encrypted recovery encryption key share; and
provide the trusted entity encrypted recovery encryption key share to the trusted entity, wherein the set of recovery encryption key shares comprises a set of person recovery encryption key shares and a set of organization recovery encryption key shares, wherein a threshold number of the set of person recovery encryption key shares can be combined to create a person recovery encryption key and a threshold number of the set of organization recovery encryption key shares can be combined to create an organization recovery encryption key, and wherein in response to receiving an indication that recovery encryption key shares from either a person threshold number of person entities or an organization threshold number of organization entities are required to recover a key, wherein the key is encrypted such that either the person recovery encryption key or the organization recovery encryption key is required to recover it.

2. The system of claim 1, wherein the processor is further configured to receive a selection of the one or more categories.

3. The system of claim 1, wherein the one or more categories comprise people, financial institutions, employers, or universities.

4. The system of claim 1, wherein the processor is further configured to receive an email address associated with each trusted entity comprising a person.

5. The system of claim 1, wherein the processor is further configured to receive a threshold number of trusted entities required for key recovery.

6. The system of claim 5, wherein the threshold number of trusted entities comprises the person threshold number of person entities required to recover the key.

7. The system of claim 5, wherein the threshold number of trusted entities comprises the organization threshold number of organization entities required to recover the key.

8. The system of claim 1, wherein the processor is further configured to receive the indication that recovery encryption key shares from either a person threshold number of person entities or an organization threshold number of organization entities are required to recover a key.

9. The system of claim 5, wherein the processor is further configured to prompt a user to confirm the threshold number of trusted entities required for key recovery in response to a determination that it is possible for a single entity to recover the key.

10. The system of claim 1, wherein the processor is further configured to receive an indication of one or more required entities required to recover a key.

11. The system of claim 1, wherein the processor is further configured to provide a default threshold number of trusted entities required for key recovery for confirmation by a user.

12. The system of claim 11, wherein the default threshold number of trusted entities comprises one fewer than the total number of person entities and one fewer than the total number of organization entities.

13. The system of claim 1, wherein the set of recovery encryption key shares is determined using Shamir's Secret Sharing Algorithm.

14. A method for key storage and recovery, comprising:
creating, using a processor, a set of recovery encryption key shares based at least in part on one or more recovery encryption keys; and
for a trusted entity in a set of trusted entities:
determining a trusted entity public key associated with the trusted entity;
encrypting a recovery encryption key share with the trusted entity public key to generate a trusted entity encrypted recovery encryption key share; and
providing the trusted entity encrypted recovery encryption key share to the trusted entity, wherein the set of recovery encryption key shares comprises a set of person recovery encryption key shares and a set of organization recovery encryption key shares, wherein a threshold number of the set of person recovery encryption key shares can be combined to create a person recovery encryption key and a threshold number of the set of organization recovery encryption key shares can be combined to create an organization recovery encryption key, and wherein in response to receiving an indication that recovery encryption key shares from either a person threshold number of person entities or an organization threshold number of organization entities are required to recover a key, wherein the key is encrypted such that either the person recovery encryption key or the organization recovery encryption key is required to recover it.

15. A computer program product for key storage and recovery, the computer program product being embodied in a non-transitory computer readable storage medium and comprising computer instructions for:
creating a set of recovery encryption key shares based at least in part on one or more recovery encryption keys; and
for a trusted entity in a set of trusted entities:
determining a trusted entity public key associated with the trusted entity;
encrypting a recovery encryption key share with the trusted entity public key to generate a trusted entity encrypted recovery encryption key share; and
providing the trusted entity encrypted recovery encryption key share to the trusted entity, wherein the set of recovery encryption key shares comprises a set of person recovery encryption key shares and a set of organization recovery encryption key shares, wherein a threshold number of the set of person recovery encryption key shares can be combined to create a person recovery encryption key and a threshold number of the set of organization recovery encryption key shares can be combined to create an organization recovery encryption key, and wherein in response to receiving an indication that recovery encryption key shares from either a person threshold number of person entities or an organization threshold number of organization entities are required to recover a key, wherein the key is encrypted such that either the person recovery encryption key or the organization recovery encryption key is required to recover it.

16. A system for key storage and recovery, comprising:
an interface configured to receive an indication to create a set of recovery encryption key shares; and
a processor configured to:
receive a selection of a set of trusted entities from one or more categories;
create a set of recovery encryption key shares based at least in part on one or more recovery encryption keys; and
for a trusted entity of the set of trusted entities:
determine a trusted entity public key associated with the trusted entity;
encrypt a recovery encryption key share of the set of recovery encryption key shares with the trusted entity public key to generate a trusted entity encrypted recovery encryption key share; and
provide the trusted entity encrypted recovery encryption key share to the trusted entity, wherein the set of recovery encryption key shares comprises a set of person recovery encryption key shares and a set of organization recovery encryption key shares, wherein a threshold number of the set of person recovery encryption key shares can be combined to create a person recovery encryption key and a threshold number of the set of organization recovery encryption key shares can be combined to create an organization recovery encryption key, and wherein in response to receiving an indication that recovery encryption key shares from both a person threshold number of person entities and an organization threshold number of organization entities are required to recover a key, wherein the key is encrypted such that both the person recovery encryption key and the organization recovery encryption key are required to recover it.

17. A method for key storage and recovery, comprising:
creating, using a processor, a set of recovery encryption key shares based at least in part on one or more recovery encryption keys; and
for a trusted entity in a set of trusted entities:
 determining a trusted entity public key associated with the trusted entity;
 encrypting a recovery encryption key share with the trusted entity public key to generate a trusted entity encrypted recovery encryption key share; and
 providing the trusted entity encrypted recovery encryption key share to the trusted entity, wherein the set of recovery encryption key shares comprises a set of person recovery encryption key shares and a set of organization recovery encryption key shares, wherein a threshold number of the set of person recovery encryption key shares can be combined to create a person recovery encryption key and a threshold number of the set of organization recovery encryption key shares can be combined to create an organization recovery encryption key, and wherein in response to receiving an indication that recovery encryption key shares from both a person threshold number of person entities and an organization threshold number of organization entities are required to recover a key, wherein the key is encrypted such that both the person recovery encryption key and the organization recovery encryption key are required to recover it.

18. A computer program product for key storage and recovery, the computer program product being embodied in a non-transitory computer readable storage medium and comprising computer instructions for:
 creating a set of recovery encryption key shares based at least in part on one or more recovery encryption keys; and
 for a trusted entity in a set of trusted entities:
  determining a trusted entity public key associated with the trusted entity;
  encrypting a recovery encryption key share with the trusted entity public key to generate a trusted entity encrypted recovery encryption key share; and
  providing the trusted entity encrypted recovery encryption key share to the trusted entity, wherein the set of recovery encryption key shares comprises a set of person recovery encryption key shares and a set of organization recovery encryption key shares, wherein a threshold number of the set of person recovery encryption key shares can be combined to create a person recovery encryption key and a threshold number of the set of organization recovery encryption key shares can be combined to create an organization recovery encryption key, and wherein in response to receiving an indication that recovery encryption key shares from both a person threshold number of person entities and an organization threshold number of organization entities are required to recover a key, wherein the key is encrypted such that both the person recovery encryption key and the organization recovery encryption key are required to recover it.

19. The system of claim 16, wherein the processor is further configured to receive the indication that recovery encryption key shares from both the person threshold number of person entities and the organization threshold number of organization entities are required to recover the key.

* * * * *

UNITED STATES PATENT AND TRADEMARK OFFICE
CERTIFICATE OF CORRECTION

PATENT NO. : 11,405,200 B1
APPLICATION NO. : 16/880155
DATED : August 2, 2022
INVENTOR(S) : Bjorn Hamel and Prakash Sundaresan It is certified that error appears in the above-identified patent and that said Letters Patent is hereby corrected as shown below:

In the Drawings

Sheet 13 of 17, figure 13, block 1314, after "From", delete "From".

Signed and Sealed this
Thirty-first Day of January, 2023

*Katherine Kelly Vidal*

Katherine Kelly Vidal
*Director of the United States Patent and Trademark Office*